Feb. 5, 1952     D. E. HYATT     2,584,588
LANDING GEAR AND FLAP CONTROL
FOR TETHERED MODEL AIRPLANES
Filed March 21, 1947
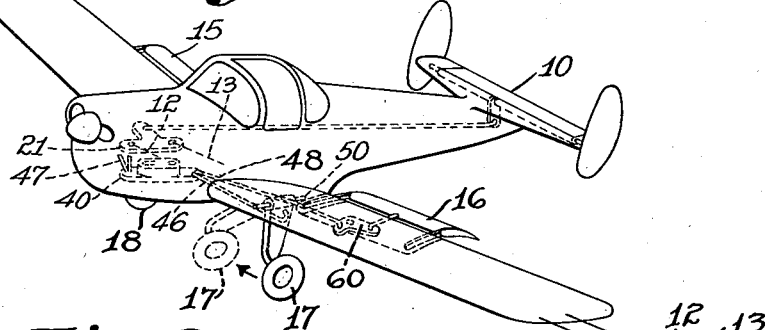
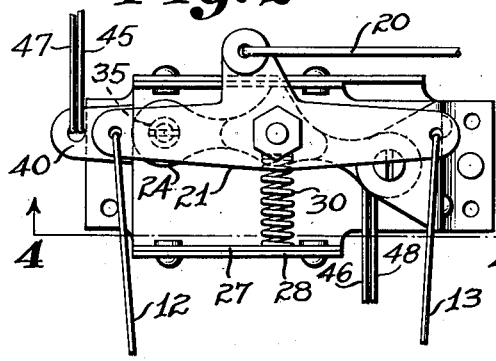
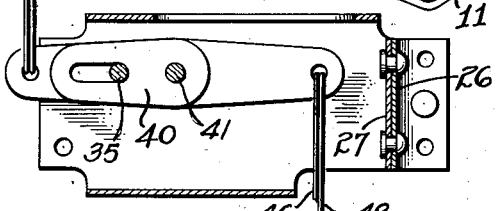
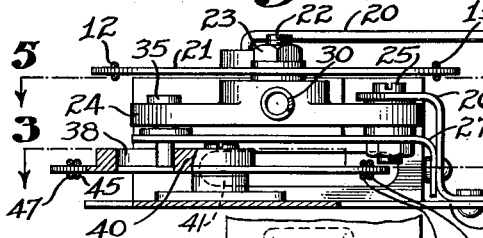
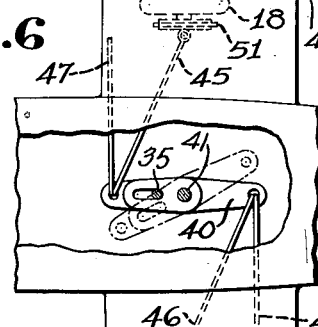
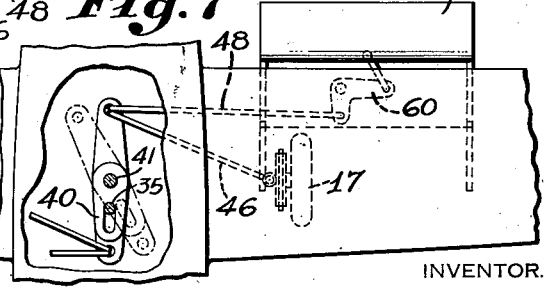
INVENTOR.
Darwin E. Hyatt
BY Lyon & Lyon
ATTORNEYS.

Patented Feb. 5, 1952

2,584,588

UNITED STATES PATENT OFFICE 2,584,588

LANDING GEAR AND FLAP CONTROL FOR TETHERED MODEL AIRPLANES

Darwin E. Hyatt, Roscoe, Calif.

Application March 21, 1947, Serial No. 736,341

2 Claims. (Cl. 46—77)

The present invention relates to model airplanes and in particular to improved control means therefor.

An object of the present invention is to provide in a model airplane control means which are automatically actuated in response to the speed of the airplane for controlling either the position of the landing gear of the airplane or the position of its flaps.

Another object of the present invention is to provide a centrifugally actuated control means in a model airplane of relatively light weight and of relatively small physical size for controlling the position of the landing gear and/or flaps of the airplane.

Still another object of the present invention is to provide an improved control cooperatively associated with conventional controls now present on existing airplanes of the type in which the elevator of the plane is controlled by movement of attached control strings. This new control is effective to automatically control the position of the landing gear and flaps.

Yet another object of the present invention is to provide an improved control arrangement for controlling all of the essential control elements of a model airplane characterized by its simplicity, lightness, compactness and ease of manufacture.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a perspective view of a model airplane with flexible controlling means extending therefrom, the airplane incorporating the apparatus embodying the present invention for controlling not only the elevator but also the landing gear and/or flaps.

Figure 2 is a top plan view of a portion of the apparatus mounted in the airplane shown in Figure 1.

Figure 3 is a sectional view taken substantially on the line 3—3 of Figure 4.

Figure 4 is a sectional view taken substantially on the line 4—4 of Figure 2.

Figure 5 is a sectional view taken substantially on the line 5—5 of Figure 4.

Figure 6 shows a plan view of a portion of the apparatus of Figure 2 connected in operative relationship to the landing gear for moving same.

Figure 7 shows a portion of the apparatus mounted in Figure 1 in operative relationship to one of the flaps for controlling the position of same.

The airplane shown in Figure 1 has an elevator 10 whose position may be controlled by manual operation of the hand grip 11 through the intermediate flexible connecting cords 12 and 13, and also has a pair of flaps 15 and 16 together with landing gear 17 and 18. The position of such landing gear and ailerons are controlled automatically in accordance with the speed of the model airplane which may be powered by an internal combustion engine carried thereon. The path of movement of the airplane model through the air by a self-contained power source, with such model held captive by the guide cords 12, 13, connected to the walking beam member 21, is in a circle about the operator grasping the handle 11, the operator being at the center of such circle with the model airplane flying in a circle, the radius of which is the length of the cords 12, 13. The speed of the model airplane causes centrifugal forces to act on the control mechanism comprising the beam member 21 and lever 24. Such centrifugal force varies, of course, as the speed of the model so that the term "centrifugal force actuated means" used in the specification and claims relates to the resulting forces acting on the beam member 21 and lever 24 when the model airplane flies in the above-mentioned circle. The flight of the airplane and the position of the elevator 10 may be controlled by simple wrist movement of the hand which grips the hand grip 11, motion of the connecting cords 12 and 13 being transferred to the elevator control rod 29 through an intermediate pivoted "walking beam" link member 21. This walking beam member 21 is fastened at a point intermediate its ends by means of the bolt and nut connection 22, 23 to the lever member 24 having one of its ends journaled for rotation on the pivot pin 25, which is stationarily mounted on the bracket members 26 and 27. These bracket members 26 and 27 are in turn riveted together and the unit thus formed is riveted to the bottom frame member 28, which is conveniently fastened to the fuselage with the apparatus thereon located symmetrically about the longitudinal center line of the airplane.

The lever member 24 is normally biased to a predetermined position by means of the compression spring 30 having one of its ends recessed in the lever member 24 and the other one of its ends abutting the upturned flange of the bracket 27.

The lever 24 has fastened on its free end the pin member 35 which passes through and engages an apertured portion 38 of a second pivoted lever member 40 which is pivotally mounted on the pivot pin 41 stationarily mounted on the bracket member 28.

The lever member 40 pivoted at a point intermediate its ends on the pivot pin 41 has its free ends connected to retracting gear actuating rods 45, 46 and also to the flap actuating rods 47, 48.

The compression spring 30 normally maintains the lever member 40 in such position that the landing gear 17, 18 and flaps 15, 16 are extended to the positions where they are most effective in landing and takeoff operations. The landing gear 17, 18 and the flaps 15, 16 are automatically moved by centrifugal force actuated means comprising the walking beam member 21 and lever 24 when the airplane attains a predetermined speed without the necessity of operating the hand grip 11. Upon the attainment of said predetermined speed the centrifugal forces acting on the assembly comprising the "walking beam" member 21, and the lever member 24 serve to pivot such assembly about the pivot pin 25 against the action of the compression spring 30. In the resulting movement of such assembly the pin member 35 secured to the lever member 24 engages and causes the lever member 40 to pivot about its pivot pin 41 to thereby produce resulting movement of the control rods 45, 46, 47 and 48.

The landing gear 17, 18 may be connected to the control rods 45 and 46 in many different ways for pivoted movement thereby; for example, the landing gear 17, 18 may have each unit thereof pivotally mounted within the fuselage or in the wing structure on stationary pivot pins 50 and 51 respectively with the extremities of the rods 46, 45 connected to the pivoted landing gear unit to thereby cause movement of the landing gear unit 17 and 18 inwardly and towards one another when and as the lever member 40 is rotated as indicated in Figure 1.

In a similar manner the flaps 15 and 16 are pivotally mounted respectively on bell crank members such as the bell crank member 60 journaled for rotation in the wing structure. The bell crank for flap 15 is not shown but is the same in structure as the bell crank 60 and is mounted opposite the flap 15 in the same manner as is the bell crank 60. The bell cranks for flaps 16 and 15 have arms thereof connecting control rod 48 to flap 16 on the one hand and connecting control rod 47 to flap 15 on the other hand to thereby automatically slide the flaps 15 and 16 out of the confines of adjacent wing structures during landing and takeoff operations. These flaps, as seen in Figure 1, are curved downwardly to produce air spoiling and braking action. Of course, in normal flight, the flaps 15, 16 are automatically retracted within the confines of the wing structures and are only effective during landing and takeoff operations.

It is apparent that the airplane may be manufactured to incorporate only the automatic retractable landing gear structure or, on the other hand, the airplane may be manufactured to incorporate only the automatic retractable flap structure, the movable elevated structure being present in either case.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a self-propelled model airplane, flexible control means extending from said airplane, stationary bracket means mounted on said airplane, a first lever member pivoted on said bracket means, a second lever member pivoted at a point intermediate its ends on said first lever member, said flexible control means being attached to opposite ends of said second lever, an elevator mounted on said airplane, means connected between said elevator and said second lever for operating said elevator in accordance with motion of said flexible control means, resilient means between said first lever and said bracket means, a third lever pivotally mounted on said bracket means, a landing gear mounted on said airplane, means connecting said third lever to said landing gear and means connecting said first lever to said third lever to thereby produce motion of said landing gear in accordance with centrifugal forces acting on the assembly comprising said lever members.

2. In a self-propelled model airplane, flexible control means extending from said airplane, stationary bracket means mounted on said airplane, a first lever member pivoted on said bracket means, a second lever member pivoted at a point intermediate its ends on said first lever member, said flexible control means being attached to opposite ends of said second lever, an elevator mounted on said airplane, means connected between said elevator and said second lever for operating said elevator in accordance with motion of said flexible control means, resilient means between said first lever and said bracket means, a third lever pivotally mounted on said bracket means, a flap, said flap being mounted on said airplane, means connecting said third lever to said flap, and means connecting said first lever to said third lever to thereby produce motion of said flap in accordance with centrifugal forces acting on the assembly comprising said lever members.

DARWIN E. HYATT.

REFERENCES CITED

The following references are of record in the file of this patent:

UNITED STATES PATENTS

| Number | Name | Date |
|---|---|---|
| 2,182,913 | Brubaker | Dec. 12, 1939 |
| 2,376,374 | Miles | May 22, 1945 |
| 2,386,288 | Blaylock | Oct. 9, 1945 |
| 2,404,922 | Padgett | July 30, 1946 |
| 2,523,902 | Effinger | Sept. 26, 1950 |

FOREIGN PATENTS

| Number | Country | Date |
|---|---|---|
| 667,623 | Germany | Nov. 17, 1938 |